United States Patent Office 3,488,737
Patented Jan. 6, 1970

3,488,737
NOVEL β-(SUBSTITUTED AMINO) PROPIOPHENONES
Philip N. Gordon, Old Lyme, Conn., assignor to Chas. Pfizer & Co., Inc., New York, N.Y., a corporation of Delaware
No Drawing. Continuation-in-part of application Ser. No. 386,041, July 29, 1964. This application Feb. 1, 1966, Ser. No. 523,925
Int. Cl. C07c *101/44*
U.S. Cl. 260—516   6 Claims

ABSTRACT OF THE DISCLOSURE

The novel compounds of this invention have the general formula

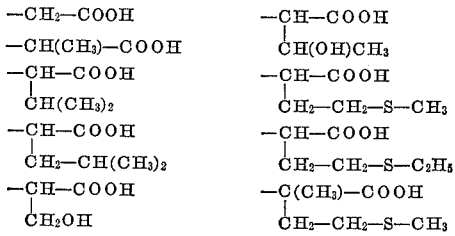

wherein $R_1$ is selected from the group consisting of hydroxy, lower alkoxy, amino, lower alkanoyloxy, lower alkylamino, lower alkanoylamino, chloro and brome; $R_2$ is selected from the group consisting of hydrogen and lower alkyl and $R_3$ is selected from the group consisting of

—CH$_2$—COOH
—CH(CH$_3$)—COOH

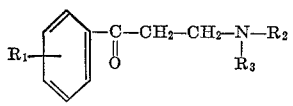

—CH—COOH
|
CH$_2$CH(CH$_3$)$_2$

—CH—COOH
|
CH$_2$OH

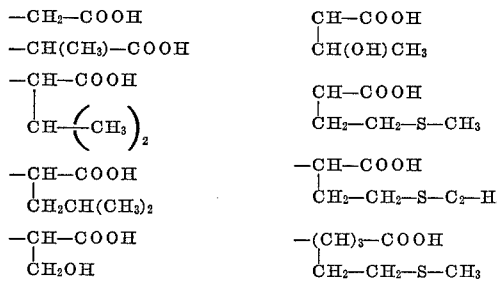

These compounds are useful as bactericides and chelating agents.

This application is a continuation-in-part of co-pending application Ser. No. 386,041, filed July 29, 1964, now abandoned.

This invention relates to a novel series of Mannich bases which are effective as bactericides and as chelating agents. More particularly it relates to a series of Mannich bases derived from acetophenones and amino acides and to the pharmaceutically acceptable salts, esters and amides thereof which are valuable bactericides and polyvalent metal ion deactivators.

The novel compounds of this invention have the general formula

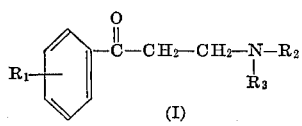

and

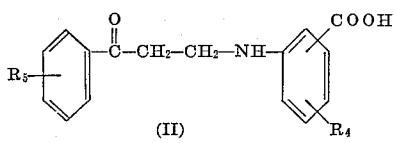

wherein $R_1$ is selected from the group consisting of hydroxy, lower alkoxy, amino, lower alkanoyloxy, lower alkylamino, lower alkanoylamino, chloro and bromo; $R_2$ is selected from the group consisting of hydrogen and lower alkyl; and $R_3$ is selected from the group consisting of —CH$_2$—COOH
—CH(CH$_3$)—COOH
—CH—COOH
|
CH(CH$_3$)$_2$
—CH—COOH
|
CH$_2$—CH(CH$_3$)$_2$
—CH—COOH
|
CH$_2$OH —CH—COOH
|
CH(OH)CH$_3$
—CH—COOH
|
CH$_2$—CH$_2$—S—CH$_3$
—CH—COOH
|
CH$_2$—CH$_2$—S—C$_2$H$_5$
—C(CH$_3$)—COOH
|
CH$_2$—CH$_2$—S—CH$_3$ each of $R_4$ and $R_5$ is selected from the group consisting of hydrogen, lower alkyl, hydroxy, lower alkoxy, amino, lower alkanoyloxy, lower alkylamino, lower alkanoylamino, chloro and bromo.

The terms "lower alkyl," "lower alkanoyl" and "lower alkoxy" as used herein refer to alkyl, alkanoyl and alkoxy groups having from one to four carbon atoms and includes the branched-chain and straight-chain radicals of the alkyl, alkanoyl and alkoxy groups having 3 and 4 carbon atoms.

Also included within the ambit of this invention are the lower alkyl esters, the unsubstituted amide derivatives, the pharmaceutically acceptable acid and base salts of these amphoteric substances, the racemic (optically inactive mixture) and the stereoisomeric forms (D- and L-) of these novel compounds. Of particular value are the mineral acid addition salts, e.g., hydrochlorides, sulfates, the lower alkanoic acid salts, e.g., acetates, propionates, butyrates and salts of such organic acids as citric, gluconic acids; the alkali metal salts such as sodium and potassium salts.

The valuable compounds of this invention are readily prepared by methods well known in the art. The most convenient methods from the standpoint of availability of materials, ease and simplicity of reaction, yield and purity of product are the Mannich reaction and the exchange reaction between the appropriate β-dimethylaminopropiophenone and the desired amino acid.

The well-known Mannich reaction consists in the condensation of the desired amino acid, generally as the hydrochloride salt, with formaldehyde and the appropriate acetophenone. The formaldehyde may be used as an aqueous solution, e.g., Formalin, or as paraformaldehyde. When aqueous formaldehyde is used the condensation is usually conducted by agitating the reactants in the absence of an organic solvent. It may also be carried out by the addition of a water soluble organic solvent such as lower alcohol, e.g., methanol, ethanol. The use of paraformaldehyde as formaldehyde source requires the use of an organic solvent such as ethyl, isopropyl and isoamyl alcohol. Alternatively, the acetophenone reactant may be used as solvent if it is a liquid at the reaction temperature. In such instances, a sufficient excess of the acetophenone reactant is added to permit good agitation, e.g., shaking or stirring.

The reaction is generally conducted at the reflux temperature of the solvent for periods ranging from a few minutes to several hours. The reaction time, of course, depends upon the nature of the reactants and the boiling point of the solvent. The acetophenone, formaldehyde and amino acid reactants are generally used in the molar proportions of 1·00 to 1·5-2·0 to 1·05-1·10.

The β-dimethylaminopropiophenone reactant utilized in the exchange reaction is a Mannich base type compound and is prepared as described above. The exchange reaction, in general, comprises reaction of the β-dimethylaminopropiophenone as the hydrochloride salt with a substantially equimolar amount of the desired amino acid in aqueous solution at a temperature of from about 50°

C. to the reflux temperature. The reaction time, as expected, is dependent upon the nature of the reactants and the temperature. It is, however, generally completed in periods of from 5 minutes to 30 minutes.

All the novel compounds of this invention exhibit activity as bactericides against a wide variety of microorganisms including gram-positive and gram-negative bacteria. Their surprising broad spectrum and high potency can be demonstrated by in vitro tests against various organisms in a brain-heart infusion medium by the usual two-fold serial dilution technique.

The in vitro antibacterial activity, expressed in mcg./ml. of several of the novel and valuable compounds of this invention versus a number of microorganisms is given below. The compounds represented by the numbers are:

(1) N-[β-(o-hydroxybenzoyl)ethyl]glycine
(2) N[β-(o-hydroxybenzoyl)ethyl]sarcosine hydrochloride
(3) N-[β-(p-methoxybenzoyl)ethyl]sarcosine hydrochloride
(4) D-N-[β-(o-hydrobenzoyl)ethyl]threonine
(5) L-N-[β-(o-hydroxybenzoyl)ethyl]threonine
(6) DL-N[β-(o-hydroxybenzoyl)ethyl]threonine
(7) DL-N-[β-(o-hydroxybenzoyl)ethyl]threonine hydrochloride
(8) L-N-[β-(o-hydroxybenzoyl)ethyl]serine
(9) DL-N-[β-(o-hydroxybenzoyl)ethyl]valine
(10) D-N-[β-(o-hydroxybenzoyl)ethyl]valine
(11) L-N-[β-(o-hydroxybenzoyl)ethyl]valine
(12) L-N-[β-(o-hydroxybenzoyl)ethyl]valine hydrochloride
(13) DL-N-[β-(o-hydroxybenzoyl)ethyl]valine hydrochloride
(14) DL-N-[β-(p-chlorobenzoyl)ethyl]valine
(15) DL-N-[β-(p-methoxybenzoyl)ethyl]valine
(16) DL-N-[β-(o-hydroxybenzoyl)ethyl]leucine
(17) L-N-[β-(o-hydroxybenzoyl)ethyl]leucine
(18) D-N-[β-(o-hydroxybenzoyl)ethyl]leucine
(19) D,L-N-[β-(o-hydroxybenzoyl)ethyl]methionine
(20) L-N-[β-(o-hydroxybenzoyl)ethyl]methionine
(21) D-N-[β-(o-hydroxybenzoyl)ethyl]methionine amino group enhances chelate formation. The complexes are somewhat soluble in water and quite soluble in non-aqueous solvent systems. This property, of course, renders them useful for a variety of purposes wherein metal ion contamination presents a problem, e.g., stabilizers in organic systems, metal extraction, biological experimentation. They are further useful in the analysis of polyvalent metal ions which may be complexed or extracted by these materials and as metal carriers. Other uses common to sequestering agents are also apparent for these compounds.

The following examples are solely for the purpose of illustration only and are not to be construed as limitations of this invention, many variations of which are possible without departing from the spirit or scope thereof.

EXAMPLE I

Preparation of D,L-N[β-(o-hydroxybenzoyl)ethyl]valine

A mixture of 1900.0 g. (8.28 moles of β-dimethylamino-o-hydroxypropiophenone hydrochloride, prepared according to Taylor and Nobles, J. Am. Pharm. Assn. Sci. Ed. 49, 317 (1960), and 9.5 liters of water is heated to 85° C. on the steam bath. A solution of 969.0 g. (8.28 moles) D,L-valine in 4.8 liters of water is added all at once and the resulting mixture heated for 10 minutes on the steam bath. The slurry is cooled to room temperature, filtered, washed with acetone and dried in the atmosphere to give 1.50 kg. crude product; M.P. 205.0–206.0° C. (dec.).

Analysis.—Calc. for $C_{14}H_{19}O_4N$: C, 63.39; H, 7.21; N, 5.28%. Found: C, 63.50; H, 7.24; N, 4.99%.

EXAMPLE II

D-N-[β-(o-hydroxybenzoyl)ethyl]valine

A mixture of 22.9 g. (0.1 mole) of β-dimethylamino-o-hydroxypropiophenone hydrochloride, 11.7 g. (0.1 mole) of D-valine and 200 ml. of water are heated to boiling for 15 minutes. The mixture is allowed to cool, then filtered and the filter cake washed with water and air dried to give 14.5 g. of product; M.P. 205–206° C. (dec.). Additional product can be obtained by evaporation of the mother liquor to small volume.

M.I.C. (mcg./ml.)

| Organism | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| S. typhosa | 6.3 | 0.39 | 3.12 | 0.78 | 0.78 | 1.56 | 1.56 | 6.25 | 3.12 | 1.56 | 0.19 | 1.56 | 0.78 | 25 | 12.5 | 3.12 | 6.25 | 12.5 | 3.12 | 12.5 | 3.12 |
| P. vulgaris | 12.5 | 0.78 | 3.12 | 1.56 | 1.56 | 1.56 | 1.56 | 6.25 | 6.25 | 1.56 | 1.56 | 3.12 | 1.56 | 25 | 100 | 6.25 | 6.25 | 12.5 | 6.25 | 12.5 | 3.12 |
| E. coli | 6.3 | 0.19 | 3.12 | 1.56 | 1.56 | 0.78 | 0.78 | 1.56 | 6.25 | 0.39 | 0.19 | 3.12 | 0.78 | 6.25 | 12.5 | 6.25 | 6.25 | 12.5 | 0.78 | 6.3 | 3.15 |
| Ps. aeruginosa | 100 | 12.5 | 25 | 100 | 100 | 100 | 6.25 | 50 | 100 | 6.25 | 6.25 | 50 | 100 | 100 | 100 | 100 | 100 | 100 | 100 | 100 | 6.22 |
| A. aerogenes | 6.3 | 0.19 | 6.25 | 0.78 | | 1.56 | 1.56 | 3.12 | 3.12 | 1.56 | 1.56 | 1.56 | 0.78 | 12.5 | 50 | 6.25 | 6.25 | 6.25 | 3.12 | 12.5 | 3.15 |
| S. pyrogenes | 100 | 50 | 100 | 100 | 100 | 50 | 6.25 | 50 | 25 | 12.5 | 12.5 | 100 | 100 | 100 | 100 | 50 | 100 | 100 | 100 | 50 | 25 |
| M. pyogenes var. Aureus | 100 | 100 | 100 | 50 | 50 | 25 | 25 | 100 | 25 | 25 | 25 | 50 | 25 | 100 | 100 | 50 | 100 | 100 | 50 | 100 | 50 |
| P. multocida | | 1.56 | 50 | 25 | 25 | 12.5 | 12.5 | 100 | | 12.5 | 12.5 | 100 | 12.5 | 100 | 010 | 50 | 12.5 | 12.5 | 25 | 25 | 12.5 |

In addition to their antibacterial properties these novel compounds also exhibit antifungal properties. Their general antimicrobial properties render them of value for topical application in the treatment of various infections, for agricultural use, and for industrial use in such industries as the laundry, textile and paper industries in a manner similar to that in which the quaternary ammonium compounds now find use.

The novel compounds of this invention also function as chelating agents for a variety of polyvalent metal ions especially for the heavy metal ions of metals of groups I–B, II–B, VI–B and VIII of the Periodic Chart of the Elements, e.g. copper, zinc, cadmium, nickel, cobalt, iron, manganese and chromium. Of particular interest as chelating agents are those compounds of Formulae I and II wherein $R_1$ is an ortho hydroxy, lower alkoxy, amino or substituted amino group. The presence of such groups enhances chelation by reason of their participation in chelate formation. Additionally, as regards compounds of Formula II, the location of the carboxyl group of the aromatic amino acid moiety ortho to the amino (—NH) group and/or the location of $R_4$ wherein $R_4$ is hydroxy, lower alkoxy, amino or substituted amino ortho to said Purification is accomplished by suspending the solid in water (1 g./16.5 ml.), heating to boiling and adding sufficient dilute acetic acid to produce a clear solution. The hot solution is filtered and cooled to give the crystalline product; M.P. sinters at 190° C., melts at 209–210° C. (dec.) $[\alpha]_D^{24} \equiv -62.9°$ (in acetic acid).

Analysis.—Calc. for $C_{14}H_{19}O_4N$: C, 63.39; H, 7.21; N, 5.28%. Found: C, 63.49; H, 7.10; N, 5.17%.

EXAMPLE III

L-N-[β-(o-hydroxybenzoyl)ethyl]valine

The procedure of Example II is repeated but substituting L-valine for D-valine to give 13 g. of product; M.P. 104–206° C., melts at 209–210° C. (dec.) $[\alpha]_D^{24} \equiv +63.2°$ (in acetic acid).

Analysis.—Calc. for $C_{14}H_{19}O_4N$: C, 63.39; H, 7.21; N, 5.28%. Found: C, 63.43; H, 7.02; N, 5.04%.

The hydrochloride salt is prepared by passing dry hydrogen chloride gas into an isopropyl alcohol suspension of the product until a clear solution results. On evaporation to small volume the salt crystallizes. It is removed by filtration, washed with isopropyl alcohol ether then dried; M.P. 180–181° C. (dec.).

*Analysis.*—Calc. for $C_{14}H_{20}O_4NCl$: N, 4.65; Cl, 11.75%. Found: N, 4.62; Cl, 11.72%.

EXAMPLE IV

[β-(o-hydroxybenzoyl)ethyl]glycine

*Method A.*—To 23.0 g. (0.20 mole) of β-dimethyl amino-o-hydroxypropiophenone hydrochloride in 200 ml. of water is added 15.0 g. (0.20 mole) of glycine and the mixture heated at 90–95° C. for 20 minutes. The yellow solution is allowed to cool to 50° C., filtered to remove some oily material, then chilled for several hours. Scatching the walls of the container promotes crystallization. The solid is removed by filtration, washed with water and then air dried (11 g.). Additional product is obtained from the mothr liquor by evaporation to small volume and addition of ethanol to the concentrate (15.4 g.).

Two recrystallizations of the product from ethanol produce off-white-yellow crystals; M.P. sinter at 170° C., melt at 204–206° C. (dec.).

*Analysis.*—Calc. for $C_{11}H_{13}O_4N$: C, 59.18; H, 5.87; N, 6.27%. Found: C, 59.00; H, 5.92; N, 6.25%.

*Method B.*—Mannich Reaction. A mixture of 13.6 g. (0.1 mole) o-hydroxyacetophenone, 4.5 g. (0.15 mole, 12.2 ml. of 37% solution) of formaldehyde, 11.2 g. (0.1 mole) glycine hydrochloride, 150 ml. of isopropyl alcohol and 5 drops of concentrated hydrochloric acid are refluxed for 1 hour. An additional 4.5 g. of formaldehyde is added and the mixture refluxed for 45 minutes more. A final 4.5 g. portion of formaldehyde is added, the mixture refluxed 1 hour then distilled to constant temperature and allowed to cool. After standing for 2 days the mixture is evaporated to small volume and allowed to stand. After 5 days the white solid was filtered off and dried to give the hydrochloride salt of the desired product.

EXAMPLE V

DL-N[β-(p-methoxybenzoyl)ethyl]valine

β-dimethylamino-p-methoxypropiophenone (24.3 g., 0.1 mole) is added to a solution of DL-valine (11.7 g., 0.1 mole) in 100 ml. water and the mixture heated to boiling for 15 minutes. The pale yellow reaction mixture, containing some crystalline product is cooled, filtered, the filter cake washed with water and dried in air. The mother liquor is boiled for 10 minutes and the crystalline solid recovered in the same manner as the first crop. Total yield=15.0 g.; M.P. 213–214° C. (dec.).

*Analysis.*—Calc. for $C_{15}H_{21}O_4N$: N, 5.02%. Found: N, 5.05%.

A portion of the product is suspended in isopropyl alcohol and dry hydrogen chloride gas passed in until a clear solution results. Evaporation of the solvent gives an oil which becomes crystalline upon trituration with ether. The hydrochloride salt melts at 140–144° C. (dec.).

EXAMPLE VI

The following compounds are prepared by the procedure of Example V from the appropriate reactants.

| Compound: | M.P. (° C., dec.) |
|---|---|
| DL-N-[β-(p-chlorobenzoyl)ethyl]valine | 218–220 |
| DL - N - [β - (p - chlorobenzoyl)ethyl]valine·HCl | 77–80 |
| L - N - [β - (o - hydroxybenzoyl)ethyl]serine | 209–211 |
| DL - N - [β - (o - hydroxybenzoyl)ethyl]serine | 205–207 |
| DL - N - [β - (o - hydroxybenzoyl)ethyl]serine·HCl | 168–170 |
| DL - N - [β - (o - hydroxybenzoyl)ethyl]-α-alanine | 211–214 |
| L - N - [β - (o - hydroxybenzoyl)ethyl]-α-alanine | 207–209 |
| L - N - [β - (o - hydroxybenzoyl)ethyl]-α-alanine·HCl | 153–156 |
| DL - N - [β - (o - hydroxybenzoyl)ethyl]-α-methylmethionine | 238–241 |
| L - N - ]β - (o - hydroxybenzoyl)ethyl]methionine | 200–202 |
| D - N - [β - (o - hydroxybenzoyl)ethyl]methionine | 202–204 |
| DL - N - [β - (o - hydroxybenzoyl)ethyl]methionine | 199–201 |
| DL - N - [β - (o - hydroxybenzoyl)ethyl]methionine·HCl | 115–120 |
| DL - N - [β - (o - hydroxybenzoyl)ethyl]leucine | 210–212 |
| L - N - [β - (o - hydroxybenzoyl)ethyl]leucine | 206–210 |
| D - N - [β - (o - hydroxybenzoyl)ethyl]leucine | 204–205 |
| DL - N - [β - (o - hydroxybenzoyl)ethyl]threonine | 194–197 |
| DL - N [β - (o - hydroxybenzoyl)ethyl]threonine·HCl | 176–178 |
| D - N - [β - (o - hydroxybenzoyl)ethyl]threonine | 206–208 |
| L - N - [β - (o - hydroxybenzoyl)ethyl]threonine | 211–213 |
| DL - N - [β - (o - hydroxybenzoyl)ethyl]ethionine | 203–205 |
| DL - N - [β - (o - hydroxybenzoyl)ethyl]ethionine·HCl | 82–84 |
| N - [β - (o - hydroxybenzoyl)ethyl]sarcosine | 208–210 |
| N - [β - (o - hydroxybenzoyl)ethyl]sarcosine·HCl [1] | 162–170 |
| N - [β - (o - hydroxybenzoyl)ethyl-3-chloro-4-carboxyaniline | 208–209 |
| N - [β - (o - hydroxybenzoyl)ethyl]-3-chloro-4-carboxyaniline·HCl | 165–167 |
| N - [β - (o - hydroxybenzoyl)ethyl]-α-aminosalicylic acid | 163–165 |
| N - [β - (o - hydroxybenzoyl)ethyl]anthranilic acid | 177–179 |
| N - [β - (o - hydroxybenzoyl)ethyl]anthranilic acid·HCl | 156–163 |
| N - [β - (o - hydroxybenzoyl)ethyl] - p-aminobenzoic acid | 218–220 |
| N - [β - (o - hydroxybenzoyl)ethyl] - p-aminobenzoic acid·HCl | 159–162 |

[1] Prepared by the Mannich reaction of Example IV.

EXAMPLE VII

The procedure of Example V is utilized to prepare the following compounds.

N-[β-(o-butoxybenzoyl)ethyl]glycine
N-[β-(m-butoxybenzoyl)ethyl]glycine
N-[β-(p-butoxybenzoyl)ethyl]glycine
N-[β-(o-butoxybenzoyl)ethyl]valine
N-[β-(o-ethoxybenzoyl)ethyl]valine
N-[β-(m-bromobenzoyl)ethyl]valine
N-[β-(p-acetoxybenzoyl)ethyl]valine
N-[β-(o-methoxybenzoyl)ethyl]glycine
N-[β-(o-propoxybenzoyl)ethyl]glycine
N-[β-(o-isopropoxybenzoyl)ethyl]glycine
N-[β-o-aminobenzoyl)ethyl]glycine
N-[β-(o-aminobenzoyl)ethyl]α-alanine
N-[β-(o-aminobenzoyl)ethyl]serine
N-[β-(o-aminobenzoyl)ethyl]threonine
N-[β-(o-aminobenzoyl)ethyl]methionine
N-[β-(o-aminobenzoyl)ethyl]valine
N-[β-(m-aminobenzoyl)ethyl]valine
N-[β-(p-aminobenzoyl)ethyl]valine
N-[β-(p-acetaminobenzoyl)ethyl]valine
N-[β-(p-acetaminobenzoyl)ethyl]leucine
N-[β-(p-butyrylaminobenzoyl)ethyl]leucine
N-[β-(p-hydroxybenzoyl)ethyl]valine N-[β-(p-hydroxybenzoyl)ethyl]α-methylmethionine
N-[β-(m-hydroxybenzoyl)ethyl]sarcosine
N-[β-(m-ethoxybenzoyl)ethyl]sarcosine
N-[β-(p-methylaminobenzoyl)ethyl]valine
N-[β-(p-butylaminobenzoyl)ethyl]valine
N-[β-(m-methylaminobenzoyl)ethyl]valine
N-[β-(o-methoxybenzoyl)ethyl]ethionine
N-[β-(o-hydroxybenzoyl)ethyl]-N-ethyl glycine
N-[β-(o-hydroxybenzoyl)ethyl]-N-butyl glycine
N-[β-(o-hydroxybenzoyl)ethyl]-N-methyl leucine
N-[β-(o-hydroxybenzoyl)ethyl]-N-isopropyl leucine
N-[β-(p-methoxybenzoyl)ethyl]-N-methyl valine
N-[β-(o-acetoxybenzoyl)ethyl]-valine
N-[β-(o-chlorobenzoyl)ethyl]-valine
N-[β-(p-bromobenzoyl)ethyl]-valine
N-[β-(p-butyroxybenzoyl)ethyl]sarcosine
N-[β-(m-chlorobenzoyl)ethyl]-valine
N-[β-(o-isopropoxybenzoyl)ethyl]threonine

EXAMPLE VIII

Compounds of the formula below are prepared according to the procedure of Example V starting with the appropriate reactants.

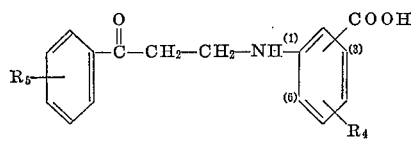

| R₅ | R₄ | COOH |
|---|---|---|
| p-OH | H | 2 |
| p-OH | H | 3 |
| p-OH | 2-CH₃ | 4 |
| o-OCH₃ | H | 2 |
| o-OC₄H₉ | H | 2 |
| p-OCH₃ | H | 2 |
| m-OCH₃ | H | 2 |
| o-CH₃ | 2-CH₃ | 4 |
| o-CH₃ | H | 4 |
| p-CH₃ | H | 4 |
| p-i-C₃H₇ | | 4 |
| o-NH₂ | 3-OH | 4 |
| o-NH₂ | 3-OCH₃ | 4 |
| o-NHCH₃ | 3-OCH₃ | 4 |
| p-NHCOCH₃ | 3-OH | 4 |
| o-OH | 2-OH | 4 |
| o-CH₃ | 2-C₄H₉ | 4 |
| o-OH | 2-OCH₃ | 4 |
| o-Cl | 2-OH | 4 |
| o-Cl | 3-OH | 4 |
| o-Br | 3-OH | 4 |
| p-Br | 3-OH | 4 |
| o-OCOCH₃ | H | 4 |
| o-OCOC₃H₇ | H | 4 |
| p-OCOCH₃ | H | 4 |
| H | H | 4 |
| H | 2-OH | 4 |
| p-OCOCH₃ | H | 2 |
| p-NH₂ | 2-NH₂ | 4 |
| p-NH₂ | 2-NHCH₃ | 4 |
| o-OH | 4-NHCOCH₃ | 3 |
| o-OCOCH₃ | 3-OCOCH₃ | 4 |
| o-OCH₃ | 3Br | 4 |
| o-OH | 4-NH-t-C₄H₉ | 3 |
| o-Cl | 2-Cl | 4 |
| H | 2-NH₂ | 4 |

The acid salts of the novel amphoteric compounds of the preceding examples are prepared by the following methods.

The hydrochloride salts are conveniently made according to the procedure described in Example V. Alternatively, anhydrous ether can be used in place of isopropyl alcohol.

Other acid salts, e.g. sulfate, acetate, propionate, butyrate, citrate and gluconate, are prepared by combining equimolar quantities of the desired acid and amphoteric compound in water, heating to complete reaction, and recovering the acid salt by evaporation in vacuo, freeze drying or precipitation by means of a water immiscible organic solvent.

EXAMPLE X

The alkali metal salts are obtained by neutralizing, in aqueous solution, the amphoteric compound with the desired base such as sodium hydroxide, potassium hydroxide or by reaction with potassium 2-ethylhexanoate. The salt is recovered by lyophilization or by freeze drying.

EXAMPLE XI

The chelating capacity of the novel compounds described herein is demonstrated as follows: 10⁻³ mole of the chelating agent is added to 50 ml. of water and an aqueous solution of the appropriate metal salt then added. The mixture is thoroughly stirred and the pH of the mixture maintained at the desired level by the addition of dilute aqueous sodium hydroxide. In this manner the chelating ability of these novel agents is demonstrated using the following metal salts in equimolor, 2 molar and 5 molar proportions based on the chelating agent; cupric chloride, nickel chloride, cobaltous nitrate, ferrous sulfate, ferric chloride, cadmium acetate, cerous acetate, zinc chloride, chromium acetate, calcium acetate, manganous chloride. Each of these preparations is conducted at pH values of 2, 5, 7 and 10.

What is claimed is:

1. A compound selected from the group consisting of those having the formula:

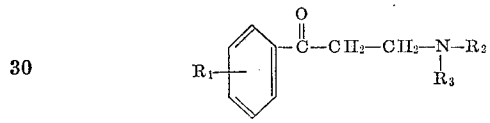

and the pharmaceutically acceptable salts thereof wherein R₁ is selected from the group consisting of hydroxy, lower alkanoyloxy, lower alkoxy, amino, lower alkylamino, lower alkanoylamino, chloro and bromo; R₂ is selected from the group consisting of hydrogen and lower alkyl; and R₃ is selected from the group consisting of

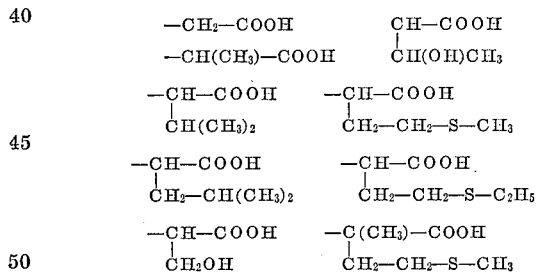

2. The compound of claim 1 having the formula:

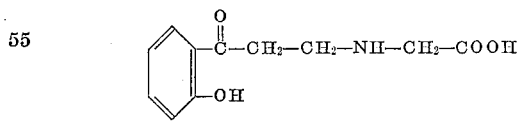

3. The hydrochloride salt of the compound of claim 1 having the formula:

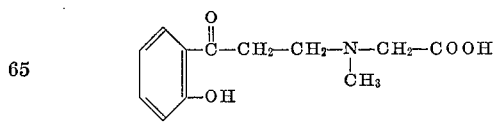

4. The compound of claim 1 having the formula:

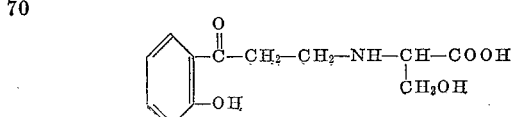

5. The compound of claim 1 having the formula:
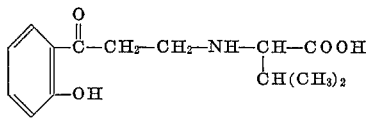
6. The hydrochloride salt of the compound of claim 1 having the formula:
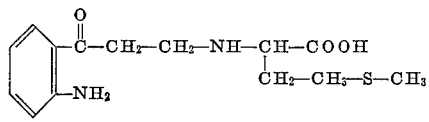
References Cited
Quick, Conjugation of Salicylic Acid with Glycine and its Action on Uric Acid Excretion, in Journal of Biochemistry vol. 101, 1933, p. 475–85.
LORRAINE A. WEINBERGER, Primary Examiner
EDWARD J. GLEIMAN, Assistant Examiner
U.S. Cl. X.R.
260—429, 429.2, 429.9, 438.1, 438.5, 439, 479, 501.11, 501.12, 518, 519, 592; 424—319